GUNNAR P. MICHELSON
INVENTOR.

BY Lyon & Lyon
ATTORNEYS

GUNNAR P. MICHELSON
INVENTOR.

BY Lyon & Lyon
ATTORNEYS 3,326,497
SOLAR CELL ARRAY
Gunnar P. Michelson, Santa Barbara, Calif., assignor to Hoffman Electronics Corporation, El Monte, Calif., a corporation of California
Filed July 24, 1964, Ser. No. 384,988
11 Claims. (Cl. 244—1)

The present invention relates to arrays of solar cells used on space vehicles for the production of electrical power. More specifically, this invention relates to a number of large solar panels so connected that they may be collapsed and stowed or unfurled for use as required.

The power requirements for a given type of space vehicle can be fairly accurately calculated. For a vehicle of any considerable size, particularly one carrying one or more human passengers, the power required to operate the vehicle becomes quite large. It has been proposed to use solar cell panels as the primary source of power in order to reduce to a minimum the amount of batteries required and therefore to save space and weight in the vehicle. The use of solar cells to provide all the power required gives rise to the problem of the size of the panels. For a given power requirement, the area of the panels can be calculated. For a power requirement of, for example, 3,400 watts, it can be calculated that the required area of the solar panels is approximately 300 square feet. A panel having such a large area could not be deployed during launch periods without overcoming the obvious problems due to acceleration and aerodynamic buffeting.

The present invention has as one of its primary objects, the provision of a solar cell array having a large surface area. It is a further object of this invention to provide a large solar array which can be folded into a compact package.

It is a more specific object of this invention to provide one or more solar cell vanes consisting of a number of hinged panels so that the array may be folded compactly and stowed on the side of a space vehicle. It is an additional object of this invention to provide a number of solar cell vanes consisting of hinged panels wherein each vane is independently controlled and may be rotated to orient the surface of the solar cells perpendicular to the impinging light rays.

Further objects and advantages of the present invention will become clear from a reading of the following description in conjunction with the accompanying drawings in which.

Figure 1:
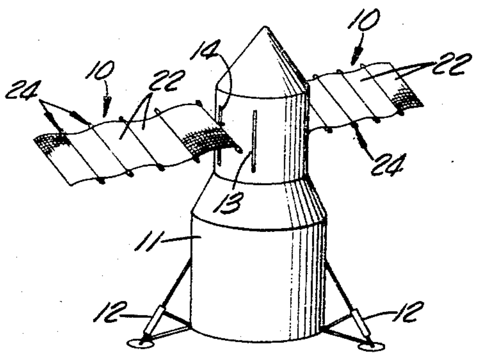
FIGURE 1 is a perspective view showing a pair of solar vanes on a space vehicle with the panels unfurled.

A solar vane made in accordance with the present invention is designated generally 10. As shown in FIGURE 1, two such vanes can be positioned on opposite sides of a space vehicle 11. It is understood that any number of such vanes could be employed as may be convenient to make up the total required surface area for the array.

Figure 2:
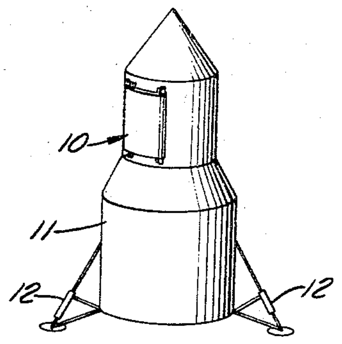
FIGURE 2 is the same view of a space vehicle showing the panels folded up and stowed.

When the solar array is not in use to produce usable electrical power, the vanes 10 are collapsed and stowed in position on the side of the vehicle 11 as shown in FIGURE 2. This position provides greater rigidity to the vanes 10 allowing it to withstand greater accelerational forces than would be the case in the unfurled position shown in FIGURE 1. The vehicle 11 shown in FIGURES 1 and 2 is shown with supporting members 12 such as may be used for landing the vehicle.

Figures 3, 8:
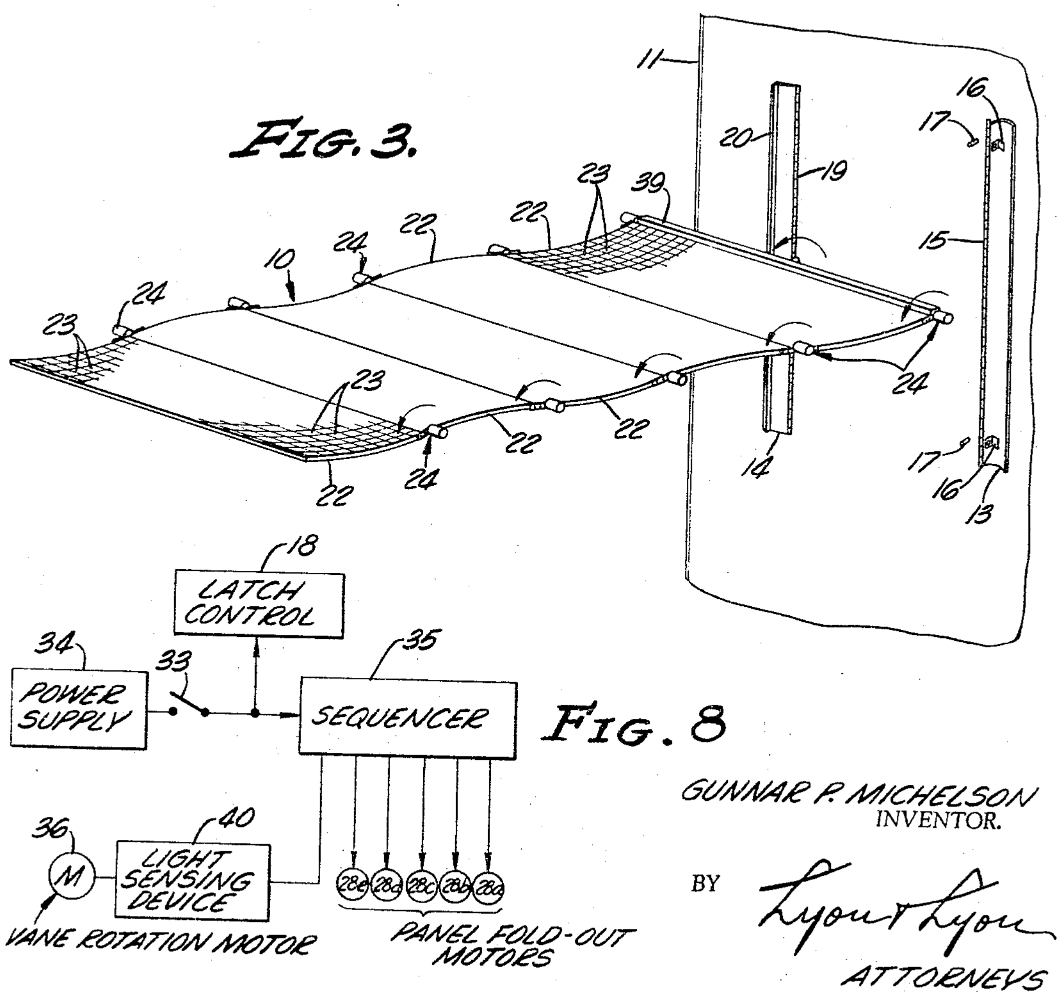
FIGURE 3 is a partial perspective view enlarged to show the association of the various parts of a solar vane.
FIGURE 8 is a block diagram of the control circuitry for the solar array.
Figures 4, 5, 6, 7:
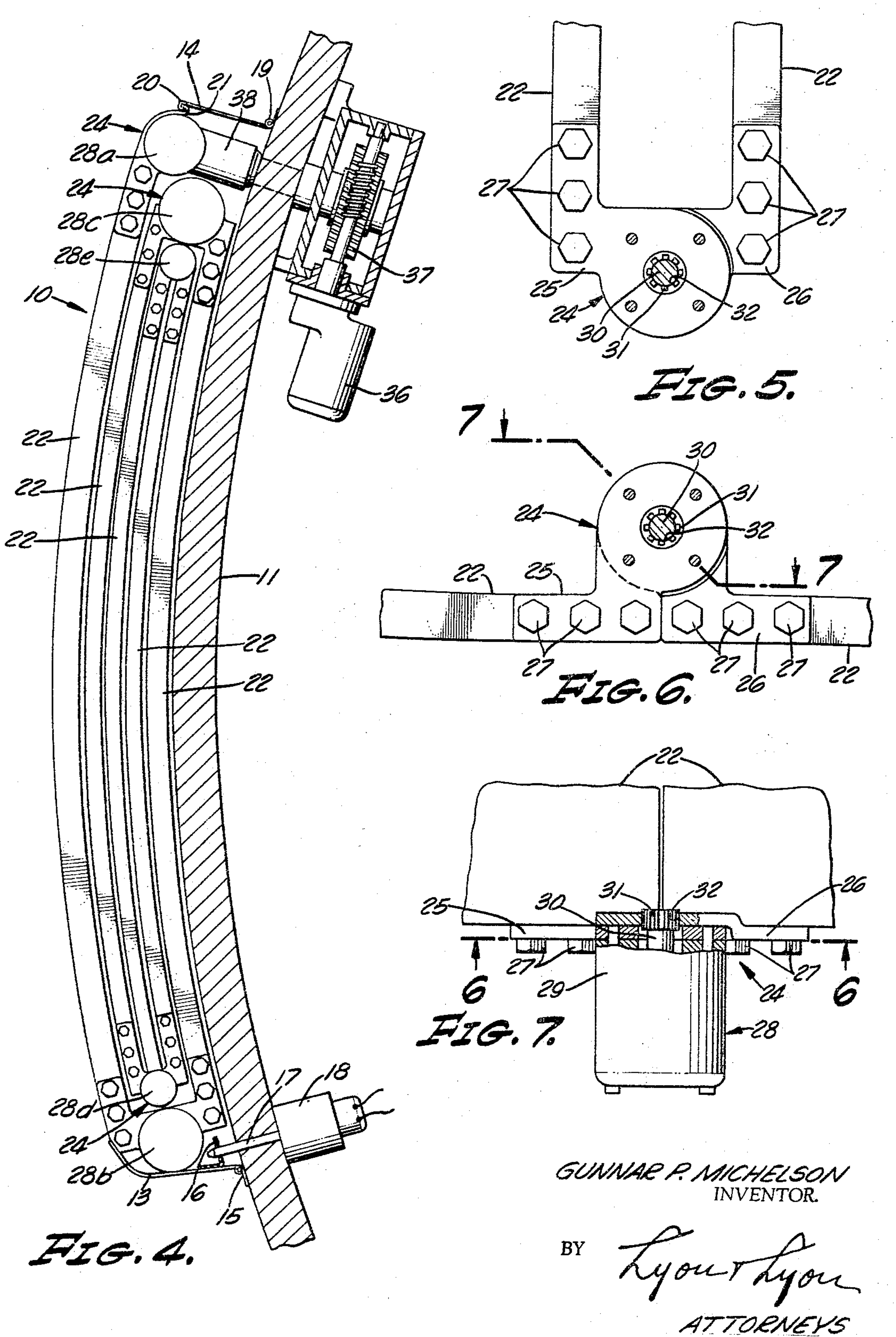
FIGURE 4 is a partial sectional side view of one solar vane in folded position showing the various actuating elements thereof.
FIGURE 5 is a partial side view of one of the hinges connecting the various solar panels, shown with the motor removed.
FIGURE 6 is a partial side view of one of the hinges with the motor removed showing the panels in their unfurled position.
FIGURE 7 is a partial sectional view taken substantially along line 7—7 of FIGURE 6.

Referring now to FIGURES 3 and 4, the solar vane 10 is retained in its folded position against the side of the vehicle 11 by means of the lateral fairings 13 and 14. Fairing 13 is mounted to the vehicle 11 by the hinge 15 and consists of a longitudinal member which is curved to overlap a folded end of the vane 10 as can be seen in FIGURE 4. In order to keep the array in the collapsed position under high stress conditions, fairing 13 is provided with latch tabs 16 which receive retractable pins 17 controlled by the latch control 18 which may be a solenoid or other similar control means. Latch pins 17 are extended through the outer shell of the vehicle 11.

The fairing 14 is similarly attached to the vehicle 11 by a hinge 19 and it has a hook-shaped flange 20 along the outer edge thereof. This flange 20 is adapted to engage in mating relationship, a hook-shaped flange 21 situated along support bar 39.

Each vane 10 consists of a number of panels 22. The drawings show five such panels but it is understood that any reasonable number could be used. The panels 22 are spiral-folded, which means that beginning with the outermost panel, each panel is successively folded over the next one. To allow spiral folding, each panel must be smaller than the one folded over it. Thus, the panel closest the space vehicle is the largest and they diminish in size going outwardly. The advantage of a spiral-fold over an accordion fold is that one degree of rigidity is provided by the abutment of the panels since all the hinges turn in the same direction. In an accordion fold, alternate hinges turn in opposite directions, thus requiring support on each side.

Panels 22 may be made flat or curved to conform to the curvature of the vehicle 11. In space, there is no contribution from diffused light and therefore only one side of each vane is covered with light responsive solar cells 23. If other types of radiation responsive cells are to be employed, it may become desirable to position them differently.

Each of the panels 22 is connected to the succeeding panel by means of a motorized hinge 24. The details of hinges 24 are more clearly shown in FIGURES 5 through 7. It will be noted in FIGURE 4 that the two inner hinges appear to be somewhat smaller. This is to allow more compact folding of the array and smaller hinges are permitted by the smaller load of the outermost panels.

In FIGURE 5, a typical hinge is shown with the panels in the folded position and the motor removed. Hinge 24 consists of two leaves 25 and 26, each of which is rigidly attached to adjacent solar panels 22 by means of fasteners 27. A gearhead motor 28 has its field housing 29 connected to leaf 25. The shaft 30 of motor 28 has a spur gear 31 mounted at the end thereof, and gear 31 engages a spline 32 in hinge leaf 26. Thus it will be seen that when motor 28 is actuated, hinge leaves 25 and 26 will be pivoted relative to one another.

In order to deploy the solar array, switch 33, FIGURE 8, coupled to a power source 34, is actuated, causing latch control 18 to release fairing 13. If latch control 18 is a solenoid, pins 17 are withdrawn from tabs 16, following which fairing 13 will be freely rotatable. To unfurl the solar vanes 10, the hinge motors 28 connected to the hinges between adjacent panels, must be actuated in pairs sequentially. To do so, a sequencing unit 35 is inserted in the circuit between switch 33 and the motors 28. This sequencer is of ordinary design, and serves to actuate, in turn, motors 28*a*, 28*b*, 28*c*, etc. When motor 28*a* is rotated, the flange 20 on fairing 14 will disengage from flange 21 situated along support bar 39. In adition, rotation of the folded vane will displace fairing 13 if it has not already moved away. After all panels 22 are unfurled, the sequencer actuates a vane rotation motor 36. This vane motor 36 is connected through appropriate gearing 37 to a central rotation shaft 38. Shaft 38 projects substantially normal to the side of vehicle 11 and into the interior thereof. Shaft 38 is connected to a transverse supporting bar 39, FIGURE 3, which supports the vane 10. Following the unfurling of the panels 22, vane rotation motor 36 can be actuated to orient the vane in any desired position to intercept direct sunlight.

To collapse the array, the vane rotation motor is activated to turn the vanes until they are aligned in the proper position. Then the operation of sequencer 35 is reversed, folding in the panels in turn by activating hinge motors 28*e*, 28*d*, 28*c*, and so on.

In the unfurled position, it may be desirable to have the array automatically heliotropic. For such a purpose, a radiation sensing device 40 could be inserted in the circuit coupled to vane motor 36.

While particular embodiments of the present invention have been shown and described, it will be obvious to a person skilled in the art that changes and modifications could be made without departing from this invention in its broader aspects and it is the aim, therefore, of the appended claims, to cover all such changes and modifications as fall within the true scope and spirit of this invention.

I claim:

1. A radiation responsive array for use on a space vehicle or the like comprising one or more vanes, each of said vanes rotatably mounted on said space vehicle, means for rotating said vanes; each of said vanes comprising two or more panels having a plurality of radiation responsive devices mounted thereon, said panels connected to one another by hinges, means attached to said hinges for folding said panels; and means for stowing said vanes in a collapsed position.

2. A radiation responsive array for use on a space vehicle or the like comprising one or more vanes, each of said vanes rotatably mounted on said space vehicle by means of a shaft, said shaft projecting from said space vehicle, means connected to said shaft for rotating said vane; each of said vanes comprising two or more panels having a plurality of radiation responsive devices mounted thereon, said panels connected to one another by hinges, means mounted on said hinges for pivotally actuating said panels; and fairing means for stowing said vanes in a collapsed position on said space vehicle.

3. A radiation responsive array for use on a space vehicle or the like comprising one or more vanes, each of said vanes rotatably mounted to said spaced vehicle by means of a shaft, said shaft projecting from said space vehicle, means connected to said shaft for rotating said vane; each of said vanes comprising two or more arcuate panels having a plurality of radiation responsive devices mounted thereon, said panels connected to one another by hinges, said hinges pivotally driven by means of gearhead motors mounted thereon; and means for stowing said vanes in a collapsed position on said space vehicle.

4. A radiation responsive array for use on a space vehicle or the like comprising one or more vanes, each of said vanes rotatably mounted to said space vehicle by means of a shaft, said shaft projecting from said space vehicle, means connected to said shaft for rotating said vane; each of said vanes comprising two or more arcuate panels having a plurality of radiation responsive devices mounted thereon, each of said panels being successively shorter than the preceding one as the vane extends outwardly, said panels connected to one another by hinges, said hinges pivotally driven by means of gearhead motors mounted thereon; and means for stowing said vanes in a spiral-folded position on said space vehicle.

5. A solar cell array for use on a space vehicle or the like comprising one or more vanes, each of said vanes rotatably mounted to said space vehicle by means of a shaft, said shaft projecting from said space vehicle, means connected to said shaft for rotating said vane; each of said vanes comprising a plurality of arcuate panels, each of said panels having a plurality of solar cells mounted on one side thereof, each panel having solar cells on the same side, said panels connected to one another by hinges, said hinges pivotally driven by means of gearhead motors mounted thereon; and means for stowing said vanes in a spiral-folded position on said space vehicle.

6. A solar cell array for use on a space vehicle or the like comprising one or more vanes, each of said vanes rotatably mounted to said space vehicle by means of a shaft, said shaft projecting from said space vehicle, means connected to said shaft for rotating said vane; each of said vanes comprising two or more arcuate panels having a plurality of solar cells mounted on one side thereof, each panel having said cells on the same side, each of said panels being successively shorter than the preceding one as the vane extends outwardly, said panels connected to one another by hinges, said hinges pivotally driven by means of gearhead motors, mounted thereon; and fairing means for stowing said vanes in a spiral-folded position on said space vehicle.

7. An article of the type described in claim 6, wherein said fairing means comprises first and second lateral fairings; said first fairing being curved to retain a folded end of said vane, said fairing having a latch tab thereon, a latch control having a retractable pin mounted on said vehicle and adapted to engage said latch tab; said second lateral fairing comprising a pivotally mounted member having a flange thereon adapted to engage a flange on one panel of said vane.

8. A solar cell array for use on a space vehicle or the like comprising one or more vanes, each of said vanes rotatably mounted to said space vehicle by means of a shaft, said shaft projecting from said space vehicle, means connected to said shaft for rotating said vane; each of said vanes comprising two or more arcuate panels having a plurality of solar cells mounted theron, said panels connected to one another by hinges, said hinges pivotally driven by means of gearhead motors mounted thereon; fairing means for stowing said vanes in a spiral-folded position on said space vehicle; and control means including a sequencer coupled to said motors sequentially actuating said gearhead motors so as to unfurl each panel in turn.

9. A solar cell array for use on a space vehicle or the like comprising one or more vanes, each of said vanes rotatably mounted to said space vehicle by means of a shaft, said shaft projecting from said space vehicle, means connected to said shaft for rotating said vane; each of said vanes comprising two or more arcuate panels having a plurality of solar cells mounted on one side thereof, all panels having said cells on the same side, said panels connected to one another by hinges, said hinges pivotally driven by means of gearhead motors mounted thereon; fairing means for stowing said vanes in a spiral-folded position on said space vehicle, and control means including a sequencer coupled to said motors sequentially actuating said gearhead motors so as to unfurl each panel outwardly in turn.

10. A solar cell array for use on a space vehicle or the like comprising one or more vanes, each of said vanes rotatably mounted to said space vehicle by means of a shaft, said shaft projecting from said space vehicle, a vane rotation motor connected to said shaft operative to orient said vane in a desired direction; each of said vanes comprising two or more arcuate panels having a plurality of solar cells mounted on one side thereof, all panels having said cells on the same side, each of said panels being successively shorter as said panels are spirally-folded inward; said panels connected to one another by hinges, said hinges pivotally driven by means of gearhead motors, said motors having the housing thereof mounted to one leaf of said hinge, the shaft of said motors having a spur gear thereon, the second leaf of each hinge having a spline thereon receiving said gear therein; fairing means for stowing said vanes in spiral-folded position on said vehicle, said fairing means comprising first and second lateral fairings; said first fairing having a curved portion adapted to retain a folded end of said vane, said fairing having a latch tab mounted thereon, a latch control having a retractable pin mounted on said vehicle and adapted to engage said latch tab; said second fairing comprising a pivotally mounted member having a flange thereon adapted to engage a flange on one panel of said vane; and control means including a latch control and a sequencer coupled to said motors for sequentially actuating said gear head motors so as to unfurl each panel in turn.

11. An article of the type described in claim 10 wherein said control means includes a light sensing device connected to said means for rotating said vanes, said sensing device operative to orient said vanes in the direction of maximum sunlight intensity.

No references cited.

FERGUS S. MIDDLETON, *Primary Examiner.*